United States Patent [19]

Behrendt et al.

[11] Patent Number: 5,137,557
[45] Date of Patent: Aug. 11, 1992

[54] SUCTION AIR FILTER FOR COMBUSTION ENGINES

[75] Inventors: Bernhard Behrendt, Beilstein; Friedrich Benning, Schwetzingen; Volker Ernst, Sachsenheim; Herbert Gelb, Hockenheim; Arthur Klotz, Remseck; Rudolf Leipelt, Marbach; Albert Scheuermann, Igersheim; Michael Teich, Mannheim, all of Fed. Rep. of Germany

[73] Assignee: Deere & Company, Moline, Ill.

[21] Appl. No.: 780,682

[22] Filed: Oct. 18, 1991

[30] Foreign Application Priority Data

Oct. 27, 1990 [DE] Fed. Rep. of Germany ....... 4034216

[51] Int. Cl.$^5$ .............................................. B01D 46/00
[52] U.S. Cl. ......................................... 55/493; 55/337; 55/502; 55/510; 210/238
[58] Field of Search ................. 55/483, 493, 502, 510, 55/511, 321, 337, 459.1; 210/237, 238

[56] References Cited

U.S. PATENT DOCUMENTS

| | | | |
|---|---|---|---|
| 3,493,115 | 2/1970 | Koches | 55/502 X |
| 4,006,000 | 2/1977 | Tortorici et al. | |
| 4,278,455 | 7/1981 | Nardi | |
| 4,350,509 | 9/1982 | Alseth et al. | |
| 4,488,889 | 12/1984 | McCarroll | 55/502 |
| 4,704,143 | 11/1987 | Percy | |
| 4,818,398 | 4/1989 | Lott et al. | 210/238 |
| 5,028,333 | 7/1991 | Wright et al. | 210/237 X |
| 5,042,999 | 8/1991 | Ernst et al. | 55/502 X |

FOREIGN PATENT DOCUMENTS

1476531 1/1943 Fed. Rep. of Germany.
3906550 6/1990 Fed. Rep. of Germany.

*Primary Examiner*—Charles Hart

[57] ABSTRACT

A suction air filter for a combustion engine includes a filter housing for receiving a filter insert and an attachment housing to which the filter housing is attached. The filter housing has a coupling end for coupling with a corresponding coupling end of the attachment housing. The suction air filter has an unfiltered air intake and a pure air outlet. A plurality of cam members are mounted on the outside of the filter housing near the coupling end thereof, and a plurality of cam elements are mounted on the outside of the attachment housing near the coupling end thereof. A rotatable coupling ring is mounted to receive the coupling ends of the filter housing and the attachment housing, and the coupling ring carries wedge members which are engagable with the cam members and the cam elements to releasably couple together the coupling ends of the housings. Dust protection shoulders or labyrinth seals are provided on both sides of the coupling ring to prevent dust from penetrating in the closure area of the attachment portion and the housing. A turning of the coupling ring effects a fixing of the filter housing to the attachment housing.

13 Claims, 7 Drawing Sheets

SUCTION AIR FILTER FOR COMBUSTION ENGINES

BACKGROUND OF THE INVENTION

The invention relates to a suction air filter for combustion engines.

From U.S. Pat. No. 4,006 000, an air filter is known with an essentially cylindrical housing which has a fresh air inlet (intake), which is arranged tangentially along the housing. A filter insert is located in this housing and air flows radially through the filter. The housing itself can be connected by a bayonet lock with a cylindrical suction air collector. A safety cartridge is located inside this suction air collector to prevent the penetration of dirt and dust into the suction air connecting piece during a change of the filter insert.

A seal is formed between the safety cartridge and the filter insert because after locking the bayonet lock, the filter insert is axially displaced in the direction of the safety cartridge and the face of the filter insert comes to rest on the face of the safety cartridge. This axial displacement is undertaken with the aid of a setting screw arranged on the face, which axially moves the end disk of the filter insert. Simultaneously, through this axial bracing, the bayonet lock is locked.

A disadvantage of the known filter arrangement is that during exchange of a filter insert, several bracing devices must be released. Furthermore, the release of this bracing device, as well as the fastening, must be carried out in accordance with a certain sequence.

If this sequence is not precisely observed, i.e., if during placement of a filter insert, the filter insert is moved at first towards the front by means of the setting screw and subsequently the bayonet lock is operated, then this leads invariably to a destruction of the axial seal of the filter insert, and thus to the leakage of air into the pure air chamber.

In addition to the cumbersome handling, the known filter arrangement also requires, due to the arrangement of the setting screw, much room for installation purposes, which in most cases of application is extremely limited.

Furthermore, from DE-GM 14 76 531, an air filter is known in which the entire housing is pushed onto a suction connection and is attached to same with a bayonet lock.

However, the disadvantage of this type of attachment is that vibrations and shocks of the vehicle, which is fitted with the known air filter, lead to a situation wherein the bayonet lock becomes loose about a rotational point 43 and is rigid connection, leads to uncontrolled movements of the air filter.

Furthermore, from DE-OS 39 06 550, a liquid filter is known in which a cup-like housing is attached to a lid with a tension strip. Such a tension strip band is capable, in the case of relatively small liquid filters, such as gasoline filters, of tightly connecting the housing to the lid. However, in the case of large-volume air filters, the axial force component produced by the tension band does not suffice for ensuring a seal of the air filter insert located inside the air filter housing.

SUMMARY

It is an object of the present invention to provide a suction filter which, even in the case of the smallest available installation space, can be easily assembled.

It is an object of the present invention to provide a suction filter which requires neither an additional axial movement nor a turning movement of the housing or of the filter insert during installation or removal.

These and other objects are achieved by the present invention wherein a suction air filter for a combustion engine includes a filter housing for receiving a filter insert and an attachment housing to which the filter housing is attached. The filter housing has a coupling end for coupling with a corresponding coupling end of the attachment housing. The suction air filter has an unfiltered air intake and a pure air outlet. A plurality of cam members are mounted on the outside of the filter housing near the coupling end thereof, and a plurality of cam elements are mounted on the outside of the attachment housing near the coupling end thereof. A rotatable coupling ring is mounted to receive the coupling ends of the filter housing and the attachment housing, and the coupling ring carries wedge members which are engagable with the cam members and the cam elements to releasably couple together the coupling ends of the housings. Dust protection shoulders or labyrinth seals are provided on both sides of the coupling ring to prevent dust from penetrating in the closure area of the attachment portion and the housing.

DETAILED DESCRIPTION

Figure 1:
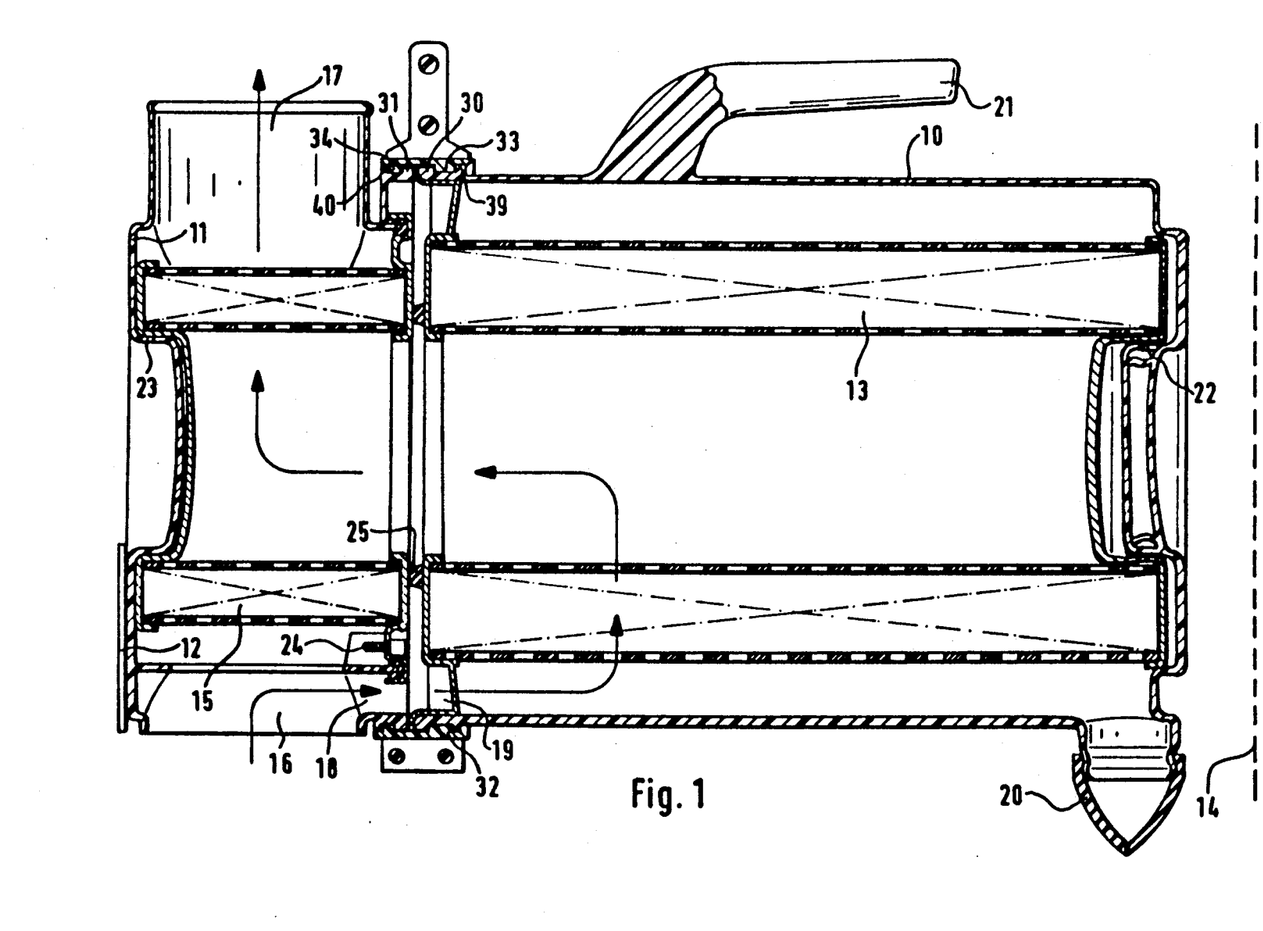
FIG. 1 is a cross sectional view of a suction air filter according to the present invention.

The suction air filter of FIG. 1 includes an attachment housing 11 which is rigidly attached to a sheet metal holder or a mounting wall 12. The attachment housing 11 also functions as a safety cartridge housing. A filter housing 10 which receives an exchangeable filter insert 13 is attached to the attachment housing 11. The dotted line 14 represents the limit of the installation space which is available for the entire suction air filter. A safety cartridge 15 is located inside the attachment housing 11. When the filter insert 13 is replaced, the safety cartridge 15 prevents the penetration of dirt into the suction air side.

The filter housing 10 as well as the attachment housing 11 have a pot-like shape. The unfiltered air intake 16 and the pure air outlet 17 are formed by the attachment housing 11. The unfiltered air flows through the unfiltered air intake 16 into an outer chamber 18 the attachment housing 11 and rom there through an axial precipitator 19 into the outer chamber of the filter housing 10. After the air has passed through the filter insert 13 it flows over the safety cartridge 15 to the pure air outlet 17.

The filter housing 10 is provided with a dust removal valve 20 and a handle 21. The closed end of the filter insert 13 is slipped onto a projection 22 with radial pre-tensioning provided inside the filter housing 10.

Also, the safety cartridge 15 is fixed in the attachment filter housing 10 on a projection 23. The safety cartridge 15 is additionally attached with a screw connection 24 on the attachment housing 11, so that the safety cartridge 15 can be removed only in exceptional cases. An annular seal 25 is located on the inner or left end of the filter insert 13. The annular seal 25 seals the intermediate space between the filter insert 13 and the safety cartridge 15. Such a seal shows a high degree of operational safety even while subjected to vibrations. However, it is also conceivable that this type of seal is not suited for the absorption of shearing forces. For this reason, the filter housing 10 is attached to the attachment housing 11 merely by an axial movement of the filter housing 10 and an axial bracing.

Figure 2:
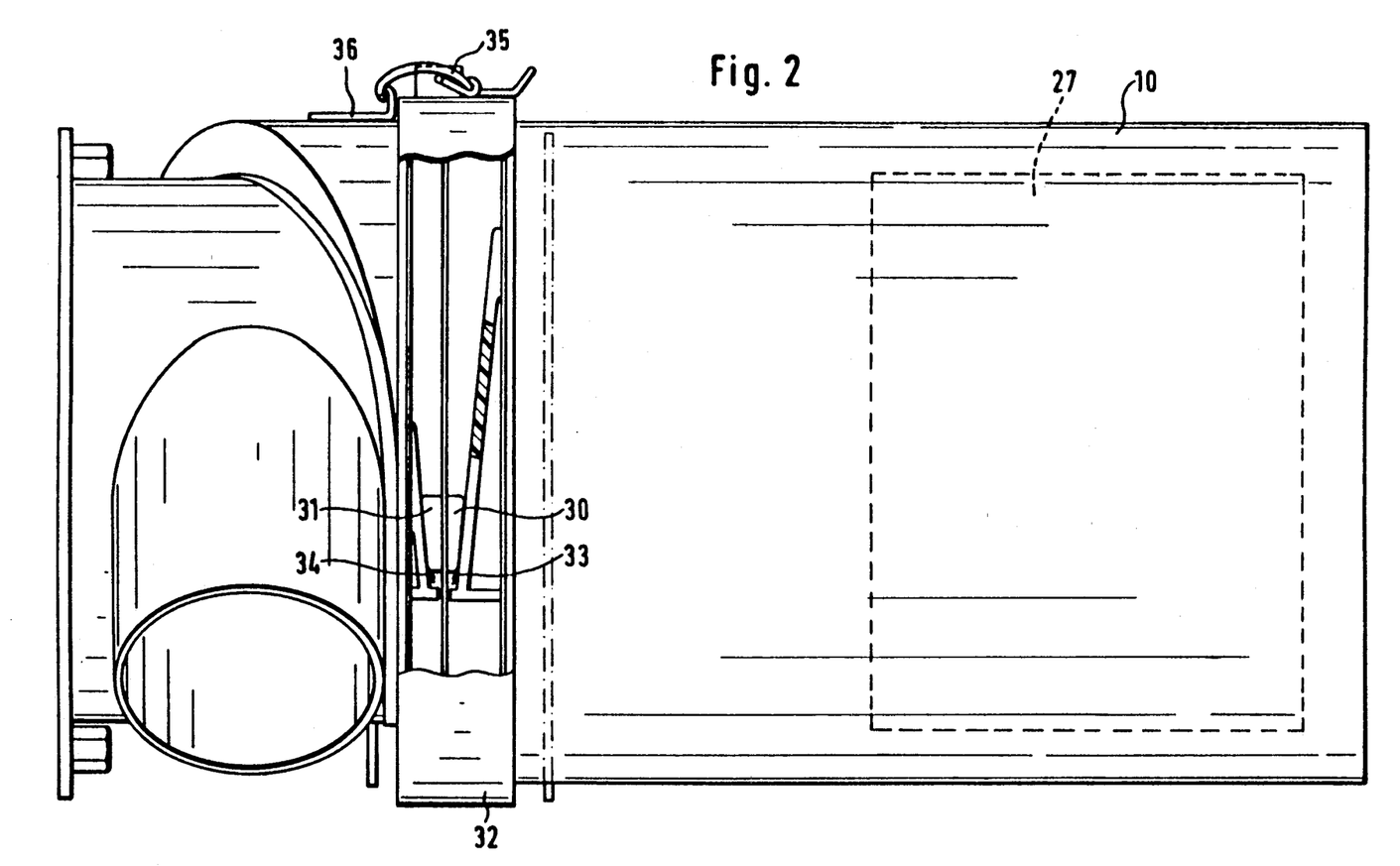
FIG. 2 is an exterior view of the suction air filter of FIG. 1.

The attachment elements for the filter housing 10 are shown in FIG. 2. A support bearing 27 is located underneath the filter housing 10, on which the filter housing 10 can be axially displaced. A plurality of cams 30, 31 are formed on the periphery of the ends of the filter housing 10 and the attachment housing 11 which are to be joined. The cams 30, 31 are distributed over the entire periphery. The cams 30, 31 are enclosed by a coupling ring 32. A plurality of wedge members or gliding surfaces 33, 34 project inwardly from the inner surface of the coupling ring 32. When the coupling ring 32 is turned, the cams 30, 31 cooperate with the gliding surfaces 33, 34 to attach the filter housing 10 to the attachment housing 11. This type of attachment prevents turning and radial movement of the filter housing 10 so that no type of shearing force effects the radial seal 25.

The length of the cam 33 is approximately one-fourth of the length of the gliding surface 33. In this way, a very small wedge angle of the gliding surface is achieved. This has the advantage that the coupling ring 32 acts in a selfinhibiting manner and thus, in the normal case, requires no additional assurance against unintentional release. In order to reduce the friction between the coupling ring 32 and the housings, the coupling ring is preferably produced from polyamide and the filter housing and/or the attachment housing portion is made of polypropylene.

However, if very strong shocks occur, then it may be desirable to additionally secure the coupling ring 32 against unintended release. For this purpose, a hook closure 35 is provided on the coupling ring 32. This hook closure 35 grips into a tongue 36 which is mounted on the attachment housing 11 and thus secures the coupling ring 32.

Cylindrical dust protection shoulders 39, 40 are formed on the ends of the filter housing 10 and the attachment housing 11. The dust protection shoulders 39, 40 are received by recesses in the coupling ring 32.

Figure 3:
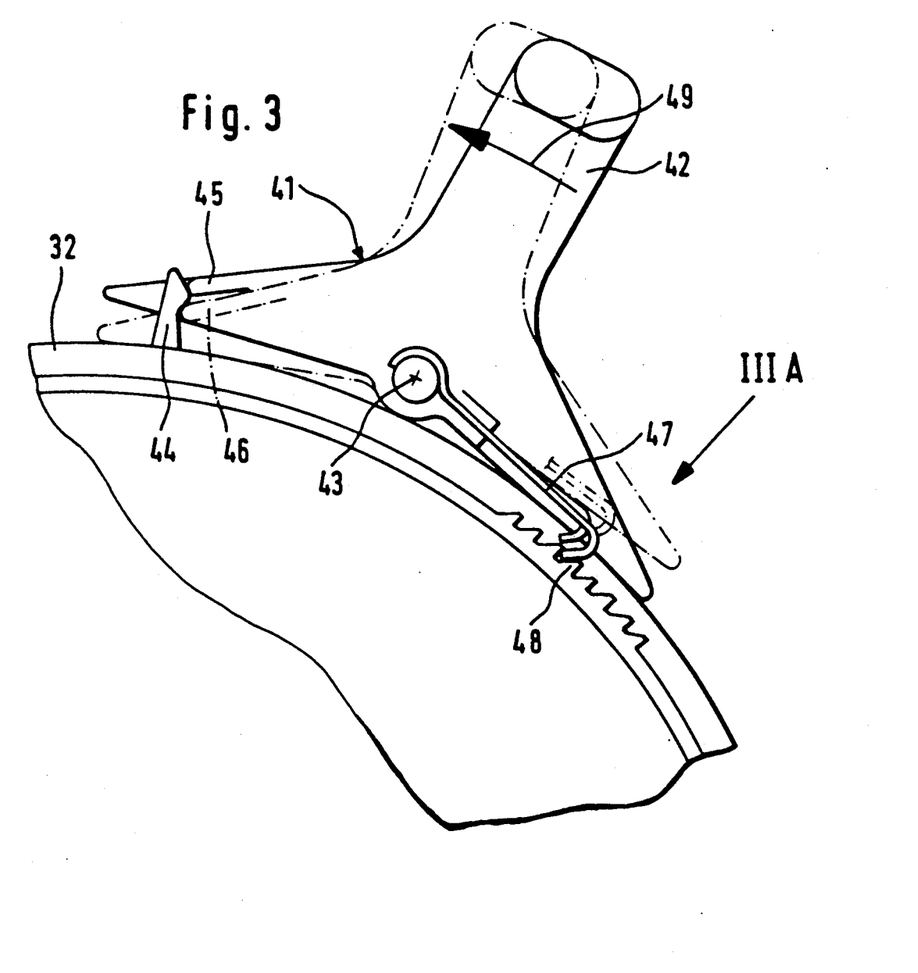
FIG. 3 is a detailed view of the locking element.

FIG. 3 shows an alternate locking mechanism for securing the coupling ring 32 against unintentional release. In this case a handle 42 is provided on the coupling ring 32. This handle 42 is tiltable about a rotational point 43 and is locked with a locking cam 44 in a closure position 45, and in a release position 46, indicated by dotted lines. The handle 42 carries a leaf spring 47, the end of which forms a hook which catches teeth or cogs 48 which are formed on the filter housing 10 and/or on the attachment housing 11.

Figure 3A:
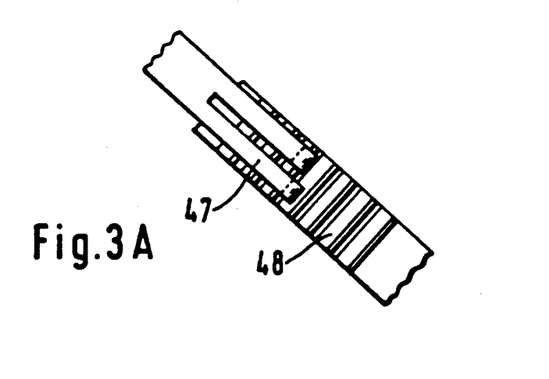
FIG. 3A is a partial view in the direction of arrow IIIA of FIG. 3.

As shown by FIG. 3A, the leaf spring 47 may be slotted to form a pair of hooks of varying lengths. This arrangement permits coarse and fine cogging locking. If the handle 42 is moved into the release position (indicated by dotted line), then the leaf spring 47 is released from the cogs 48 and the coupling ring 32 can be opened by a movement in the direction of the arrow 49.

Figure 4:
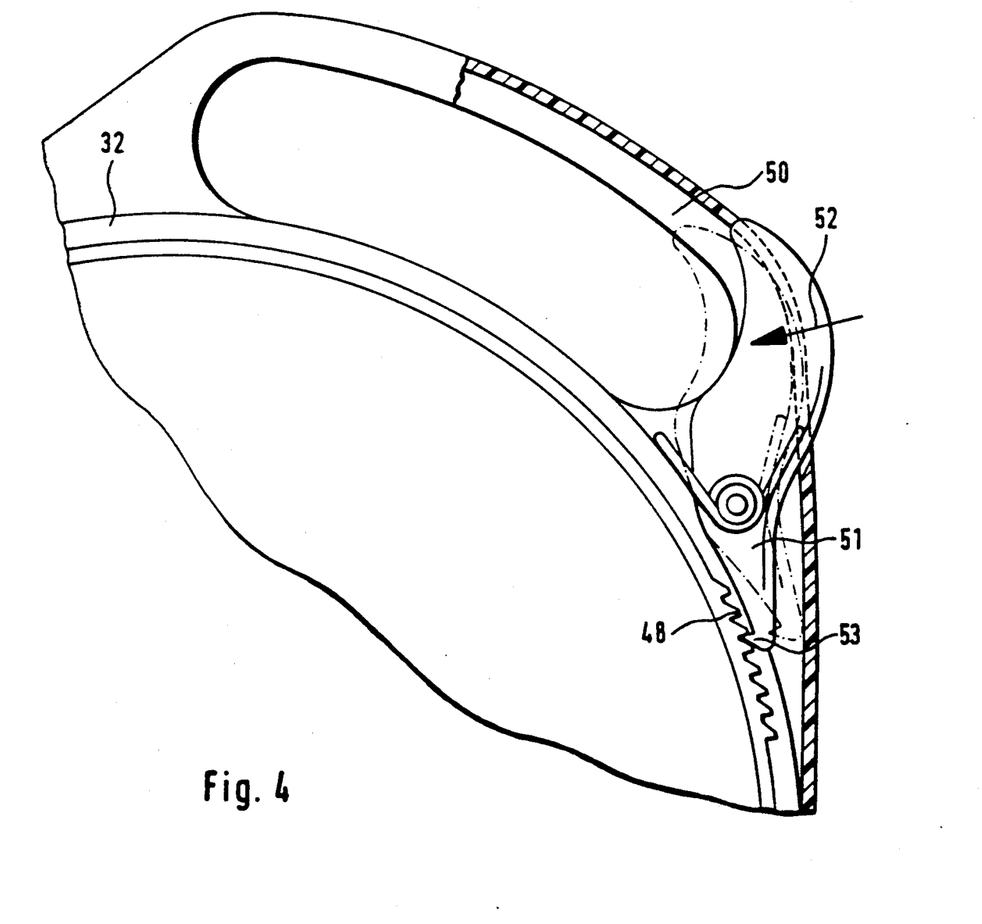
FIG. 4 is a view of an alternate locking element.

Another embodiment of a locking element is shown in FIG. 4. In this embodiment, teeth or cogs 48 are also formed on the filter housing 10 and/or on the attachment housing 11. A handle 50 is mounted on the coupling ring 32 and the handle 50 has a resilient hook 51. This hook 51 grips the teeth or cogs 48. The hook 51 is moved downwardly in the direction of the arrow 52 to release the hook 53 from the teeth 48 and to thereby release the coupling ring 32, so that a turning of the coupling ring 32 is possible. Thus, the handle 50 clamps the coupling ring in a desired position and it braces the coupling ring 32.

Figure 5:
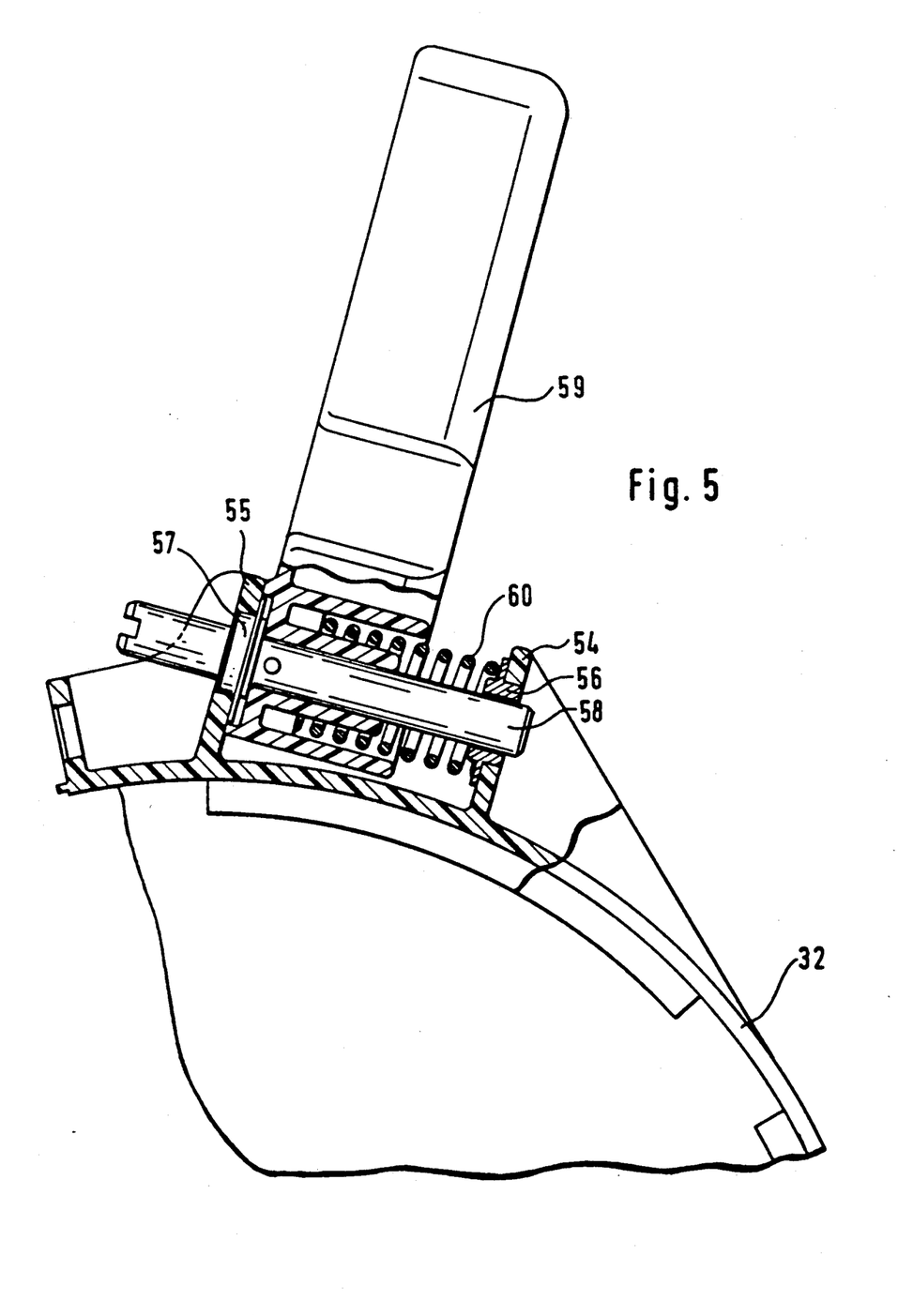
FIG. 5 is a view of another alternate locking element.
Figure 6:
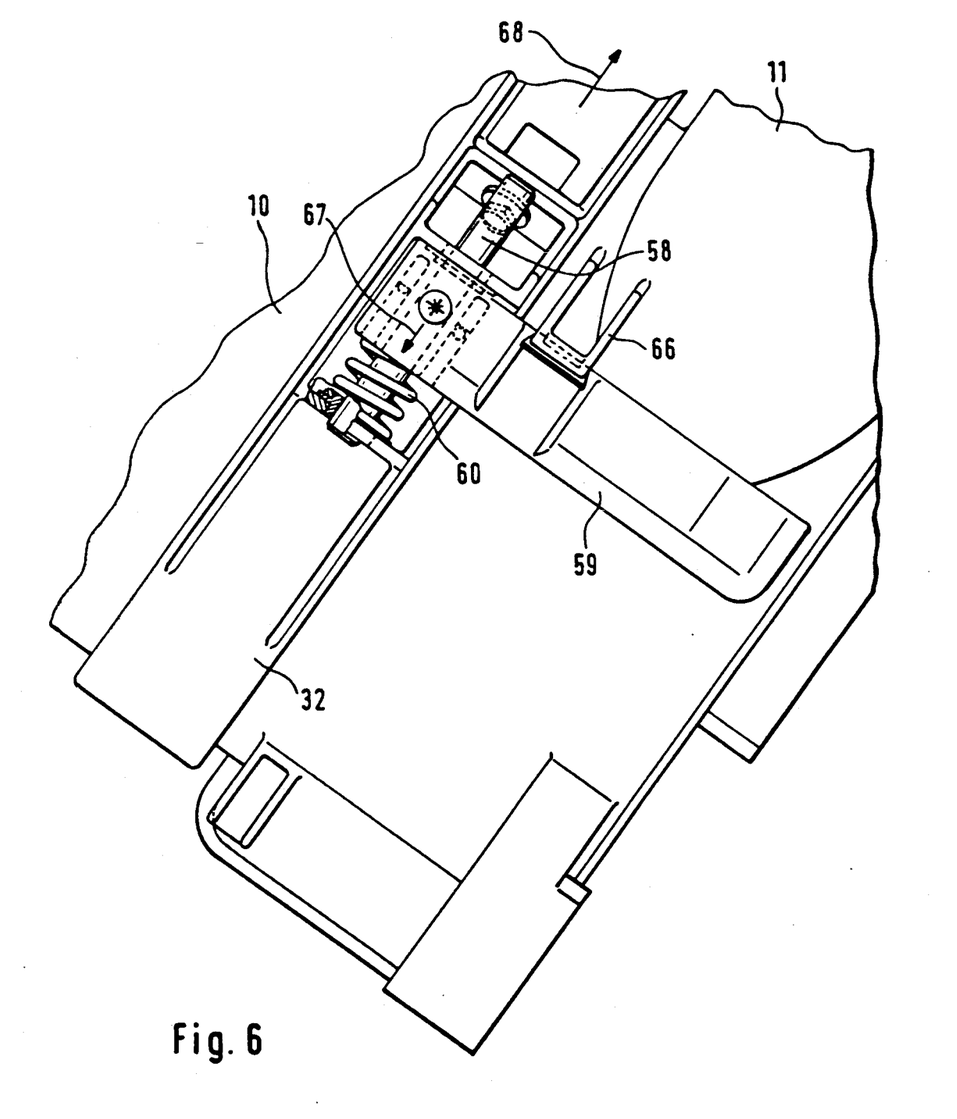
FIG. 6 is a view in the direction of lines 6—6 of FIG. 5.
Figure 7:
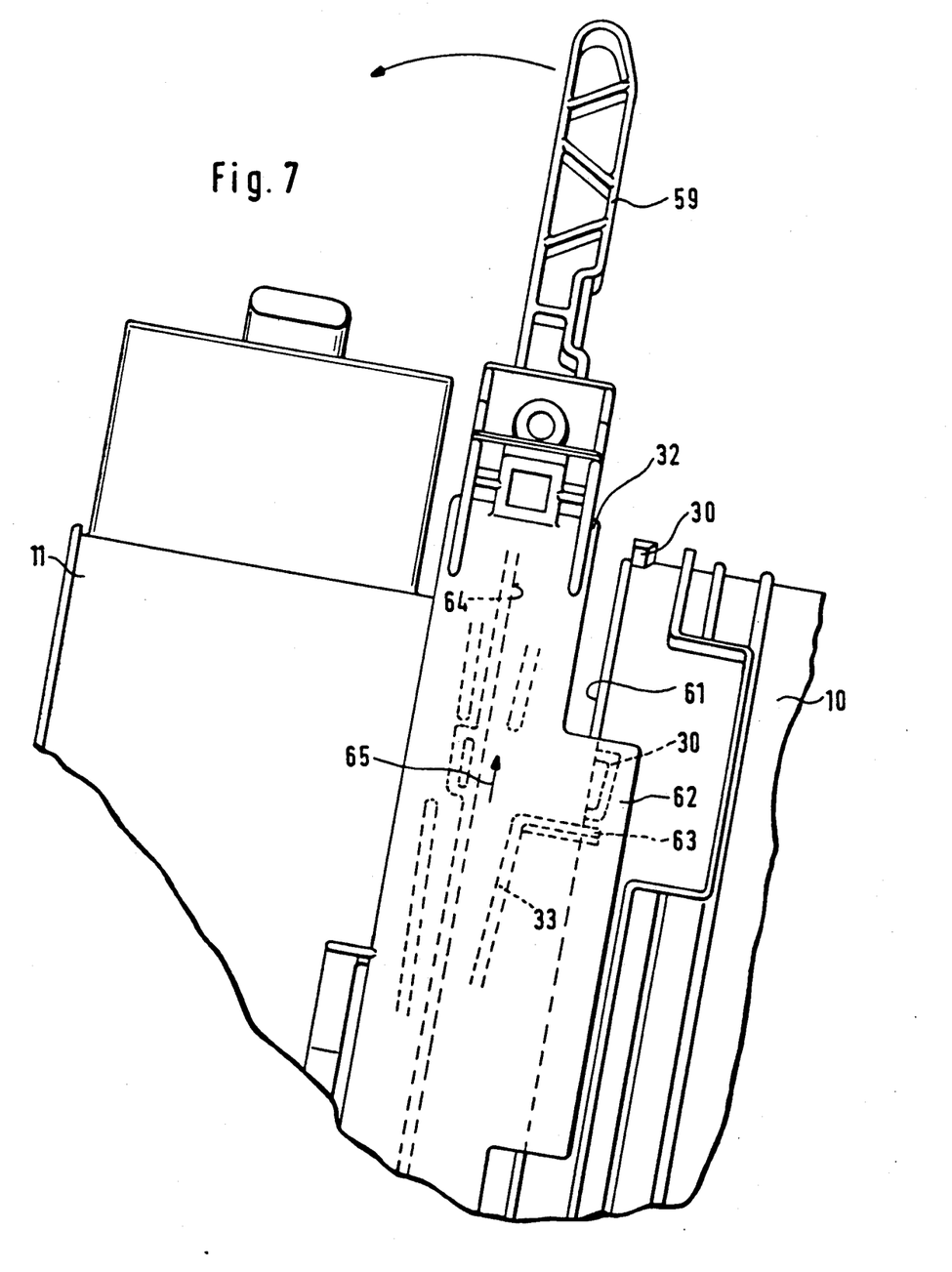
FIG. 7 is a side view of the locking element of FIG. 5.

Referring now to FIGS. 5, 6 and 7, there is shown yet another embodiment. In this embodiment the coupling ring 32 is held in the closed position by means of an inclinable and lockable lever under spring pre-tensioning. In particular, a pair of bearing members 54, 55 are formed on the coupling ring 32 outside of the filter housing 10. Bushings 56, 57 are mounted in bores in the bearing members 54, 55. A pin 58 is received by the bushings 56, 57, and a lever 59 is attached to the pin 58.

The lever 59 is movable along the axis of the pin 58 between the bearing members 54, 55. A pressure spring 60 normally holds the lever 59 in an open position wherein it engages the bearing member 55 and wherein the bayonet ring can be turned by means of the lever 59.

Referring now to FIG. 6, there is shown a portion of the filter housing 10 of the attachment housing 11 and the coupling ring 32, and the coupling ring 32 and the lever 59 are in the closed position.

Referring now to FIG. 7, the filter housing 10 has not yet been moved into engagement with the attachment housing 11, and the contact surface 61 is has not yet been moved to a position inside the coupling ring 32. However, in this embodiment, the coupling ring 32 includes at least one tab 62 which projects axially from the main body of the ring 32. The projection 62 is provided with guide members 63 which help guide the cams 30 into engagement with the gliding surface 33.

As long as the contact surface 61 of filter housing 10 does not fully engage the contact surface 64 of the attachment housing 11, the cams 30 on the filter housing 10 will prevent closing movement of the coupling ring 32 in the direction of the arrow 65. When the contact surface 61 of filter housing 10 fully engages the contact surface 64 of the attachment housing 11, then the cams 30 on the filter housing 10 will move away from the guide members 63 and into engagement with the gliding surfaces 33. The coupling ring 32 can then be moved in the direction of the arrow 65, to clamp the filter housing 10 to the attachment housing 11.

After the coupling ring 32 has been moved into the closing position, the lever 59 can be tilted in the direction of the attachment housing 11. The lever 59 engages a locking element 66 which is located on the attachment housing 11.

As a result of manufacturing tolerances, the closed position of the lever 59 may have small deviations from a normal or intended position. Therefore, the lever 59 is movable axially on the pin 58 against the pressure spring 60. This assures that, regardless of such tolerances, there will be complete engagement of the lever 59 with the locking element 66, and assures that there will be complete engagement of the filter housing 10 with the attachment housing 11.

In order to move the coupling ring 32 to its open position, the lever 59 is moved at first against the force of the pressure spring 60 in the direction of the arrow 67, and then is pivoted upwardly. In this way, the lever 59 assumes its position shown in FIG. 5 and the coupling ring 32 can be moved in the direction of the arrow 68 (best seen in FIG. 6) by means of the lever 59 until the open position has been achieved.

With this design it can be seen that neither an additional axial movement nor a turning movement of the housing or of the filter insert is required during the installation or removal. In this way it is assured that sealing elements at the filter insert or at the housing or at the attachment portion do not have to be subjected to shearing forces. For the attachment or release of the housing, merely a movement of the coupling ring about a certain turning angle range is required. This is also possible in those cases where the suction air filter is not freely accessible but must be inserted or removed in a confined space.

Also, during release of the coupling ring, the distance between the mating parts is increased, so that an accumulation of dirt between the mating parts does not hinder the release of the coupling ring.

We claim:

1. A suction air filter for a combustion engine, having a filter housing for receiving a filter insert and an attachment housing to which the filter housing is attached, the filter housing having a coupling end for coupling with a corresponding coupling end of the attachment housing, an unfiltered air intake, and a pure air outlet, characterized in that:

a plurality of cam members are mounted on the outside of the filter housing near the coupling end thereof; and a rotatable coupling ring is mounted to receive the coupling ends of the filter housing and the attachment housing, the coupling ring carrying wedge members which are engagable with the cam members so that rotation of the coupling ring will cause the wedge members to move the cam members and releasably couple together the coupling ends of the housings.

2. The suction air filter of claim 1, characterized in that:

a plurality of cam elements are mounted on the outside of the attachment housing near the coupling end thereof; and the coupling ring carrying wedge elements which are engagable with the cam elements so that rotation of the coupling ring will cause the wedge members and the wedge elements to move the cam members and the cam elements together and releasably couple together the coupling ends of the housings.

3. The suction air filter of claim 1, wherein:

annular dust protection shoulders are mounted on the attachment housing and on the filter housing, the shoulders being engagable with the coupling ring to protect from the environment the releasable connection between the housings.

4. The suction air filter of claim 1, wherein:

an axially movable hook closure is mounted on the coupling ring, the hook closure being engagable with a tab on one of the housings to clamp the coupling ring in a closed position.

5. The suction air filter of claim 1, wherein:

a plurality of teeth are arranged on one of the housings near the coupling ring; and a locking element mounted on the coupling ring, the locking element having a hook which is engagable with the teeth to releasably hold the coupling ring in a closed position.

6. The suction air filter of claim 5, wherein:

the locking element includes a handle which is pivotal about a pivot axis from a release position wherein the hook is disengaged from the teeth to a locked position wherein the hook is engaged with the teeth.

7. The suction air filter of claim 1, wherein:

the coupling ring is provided with a handle which clamps the coupling ring in a desired position and which braces the coupling ring.

8. The suction air filter of claim 1, wherein:

the coupling ring carries a lever which is pivotal in axial direction; and a locking element is mounted on one of the housings, the lever being releasably engagable with the locking element to hold the coupling ring in the closed position.

9. The suction air filter of claim 8, wherein:

a pair of spaced apart bearing members are mounted on the coupling ring;

a pin is supported between the bearing members;

the lever is rotatably and slidably mounted on the pin; and a spring is mounted on the pin between the lever and one of the bearing members to resiliently urge the lever towards the other bearing member.

10. The suction air filter of claim 1, wherein:

the coupling ring has at least one guide member which extends axially from one of the wedge members, the guide member being engagable with one of the cam members to prevent a closure of the coupling ring when the housings are not in complete engagement with each other.

11. The suction air filter of claim 1, wherein:

the coupling ring carries a stop spring which is engagable with locking teeth formed on the attachment housing when the coupling ring is in the open position.

12. The suction air filter of claim 1, wherein:

the filter housing has a projection onto which is mounted the filter insert; and an annular seal is mounted on an end of the filter insert, the annular seal engaging a portion of the attachment housing to prevent air flow from the unfiltered air chamber to the pure air chamber except via the filter insert.

13. The suction air filter of claim 12, wherein:

the projection of the filter housing has a cylindrical guide surface which extends into the filter insert and on which the filter insert rests; and an attachment collar is mounted on an end of the filter insert, the collar extending between the filter insert and the filter housing.

* * * * *